(12) United States Patent
Taylor et al.

(10) Patent No.: US 7,094,029 B2
(45) Date of Patent: Aug. 22, 2006

(54) METHODS AND APPARATUS FOR CONTROLLING GAS TURBINE ENGINE ROTOR TIP CLEARANCES

(75) Inventors: Steven Mitchell Taylor, Milford, OH (US); Christina Marie Spencer, Dickson, TN (US); Dragos Nicolae Licu, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 383 days.

(21) Appl. No.: 10/430,485

(22) Filed: May 6, 2003

(65) Prior Publication Data
US 2004/0223846 A1 Nov. 11, 2004

(51) Int. Cl.
*F01D 25/24* (2006.01)

(52) U.S. Cl. .................. 415/213.1; 415/214.1
(58) Field of Classification Search ............. 415/213.1, 415/214.1, 173.1, 177, 178
See application file for complete search history.

(56) References Cited

U.S. PATENT DOCUMENTS

| 3,907,455 | A | | 9/1975 | Monsarrat |
| 4,063,847 | A | | 12/1977 | Simmons |
| 4,371,311 | A | | 2/1983 | Walsh |
| 4,875,828 | A | * | 10/1989 | Willkop et al. ............ 415/173.4 |
| 5,092,737 | A | * | 3/1992 | Lau ............ 415/173.2 |
| 5,188,507 | A | | 2/1993 | Sweeney |
| 5,201,846 | A | | 4/1993 | Sweeney |
| 5,462,403 | A | * | 10/1995 | Pannone ............ 415/173.1 |
| 5,749,701 | A | | 5/1998 | Clarke et al. |
| 5,772,400 | A | | 6/1998 | Pellow |
| 6,120,242 | A | | 9/2000 | Bonnoitt et al. |
| 6,783,324 | B1 | * | 8/2004 | Muny ............ 415/173.1 |

FOREIGN PATENT DOCUMENTS

JP 05288080 A * 11/1993

\* cited by examiner

*Primary Examiner*—Edward K. Look
*Assistant Examiner*—Richard A. Edgar
(74) *Attorney, Agent, or Firm*—Armstrong Teasdale LLP; William Scott Andes

(57) ABSTRACT

A method enables a gas turbine engine compressor including a stator assembly and a rotor assembly to be assembled. The method comprises providing a casing formed from a plurality of rings, and coupling a first of the casing rings around the rotor assembly such that a radially inner surface of the first casing ring is axially aligned with, and radially outward from, a row of rotor blades extending from the rotor assembly. The method also comprises coupling a second of the casing rings to the first casing ring with a fastener assembly, such that the first casing ring radially inner surface facilitates insulating the fastener assembly from the compressor flowpath.

20 Claims, 6 Drawing Sheets

METHODS AND APPARATUS FOR CONTROLLING GAS TURBINE ENGINE ROTOR TIP CLEARANCES

BACKGROUND OF THE INVENTION

This invention relates generally to gas turbine engines, and more particularly, to methods and apparatus for assembling gas turbine engine compressors.

At least some known gas turbine engines include a compressor, a combustor, and at least one turbine coupled in a serial axial-flow relationship. The compressor compresses air which is then channeled to the combustor. The compressed air is mixed with fuel and ignited within the combustor to generate combustion gases which are channeled to the turbine. The turbine extracts energy from the combustion gases to power the compressor, as well as to produce useful work to propel an aircraft in flight or to power a load, such as an electrical generator.

Known compressors include a rotor assembly and a stator assembly. The rotor assembly may include a plurality of rotor blades extending radially outward from a shaft. The stator assembly may include a plurality of stator vanes which are coupled between adjacent rows of rotor blades to form a nozzle for directing combustion gases passing therethrough to downstream rotor blades. More specifically, the stator assembly is coupled to the rotor assembly with a fastener assembly or a controlling mass. Maintaining clearances between tips of the rotor blades and the surrounding casing facilitates increasing the operating efficiency of the compressor. However, controlling tip clearances may be difficult because the stationary stator assemblies may thermally expand at a quicker rate than the rotating rotary assembly.

To facilitate controlling flowpath deflection, at least some known compressors use either a split casing, a stacked continuous ring casing, or a continous casing with a segmented flowpath surface coupled to it. Each compressor casing offers advantages and disadvantages. For example, the split casing includes a pair of longitudinally split halves that are bolted together around the rotor assembly. The flowpath surface is then formed after liners are coupled to the split halves. Although the liners insulate the controlled mass from the flowpath, assembly costs are typically higher because of the milling, and pressure deflections and thermal gradients may cause out-of-roundness. In contrast, the stacked continuous ring configuration includes a series of annular rings that are coupled together around the rotor assembly. However, because the flowpath surfaces are integral to the rings, the rings may experience additional thermal growth because they are directly exposed to the flowpath. Within the continuous casing configuration, all of the stator vanes are initially installed around the rotor assembly before a single continuous casing is coupled around them. Each stator vane assembly is then coupled to the casing for retention. Although the controlling mass is insulated from the flowpath, the compressor is much more complicated to assemble, and as such may be more costly than the previously described compressor casing assemblies.

BRIEF DESCRIPTION OF THE INVENTION

In one aspect, a method for assembling a gas turbine engine compressor including a stator assembly and a rotor assembly is provided. The method comprises providing a casing formed from a plurality of rings, and coupling a first of the casing rings around the rotor assembly such that a radially inner surface of the first casing ring is axially aligned with, and radially outward from, a row of rotor blades extending from the rotor assembly. The method also comprises coupling a second of the casing rings to the first casing ring with a fastener assembly, such that the first casing ring radially inner surface facilitates insulating the fastener assembly from the compressor flowpath.

In another aspect, a compressor for a gas turbine engine is provided. The compressor includes a rotor assembly and a casing. The rotor assembly includes a plurality of circumferentially-spaced apart rotor blades, wherein each blade extends radially outwardly from a radially inner rim to a tip. Each rotor blade rim defines a portion of a radially inner flowpath surface through the compressor. The casing extends circumferentially around the rotor assembly, and includes at least a first ring and a second ring. The first ring includes a radially inner surface that defines a portion of a radially outer flowpath surface through the compressor. The first ring inner surface is spaced radially outwardly from the plurality of rotor blade tips. The second ring coupled to the first ring by a fastener assembly, such that the first ring radially inner surface facilitates substantially insulating the fastener assembly from the compressor flowpath.

In a further aspect, a gas turbine engine is provided. The gas turbine engine includes a rotor assembly, a stator assembly, and a casing. The rotor assembly includes a plurality of rows of circumferentially-spaced apart rotor blades. Each of the blades extends radially outwardly from a radially inner rim to a tip. Each rim defines a portion of a radially inner flowpath surface through the compressor. The stator assembly includes at least one row of vane assemblies that extend between adjacent rows of rotor blades. Each vane assembly includes a vane and an outer band. The casing extends circumferentially around the rotor and stator assemblies, and includes a plurality of rings coupled together by at least one fastener assembly. A first of the plurality of rings is axially aligned with, and radially outward from at least one row of the plurality of rotor blades. The first ring includes a radially inner surface that defines a portion of a radially outer flowpath surface through the compressor. The first ring radially inner surface facilitates substantially insulating the at least one fastener assembly from an engine combustion flowpath defined through the engine.

DETAILED DESCRIPTION OF THE INVENTION

Figure 1:
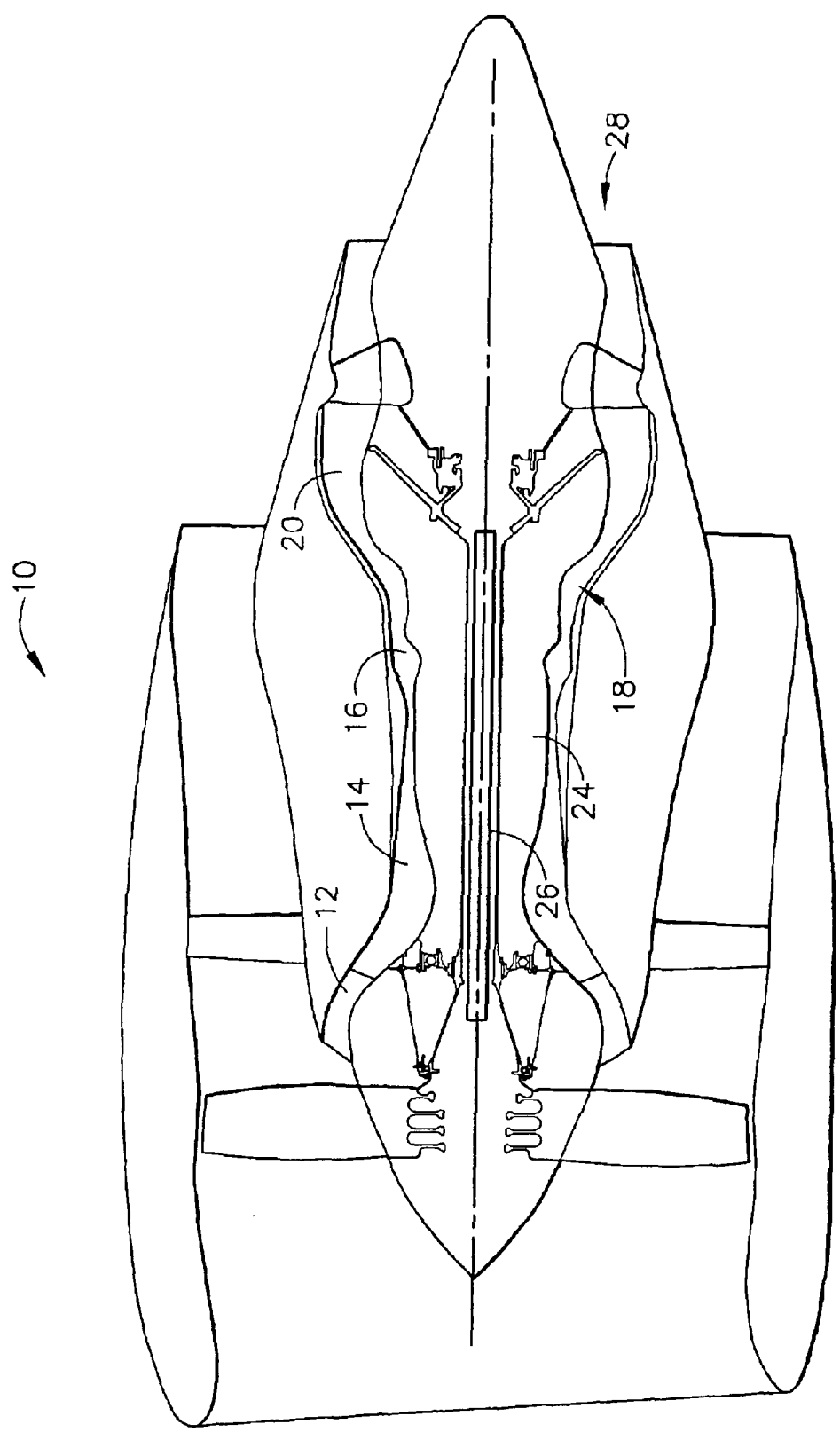
FIG. 1 is a schematic of a gas turbine engine.

FIG. 1 is a schematic illustration of a gas turbine engine 10 including a low pressure compressor 12, a high pressure compressor 14, and a combustor 16 that defines a combustion chamber (not shown). Engine 10 also includes a high pressure turbine 18, and a low pressure turbine 20. Compressor 12 and turbine 20 are coupled by a first rotor shaft 24, and compressor 14 and turbine 18 are coupled by a second rotor shaft 26. In one embodiment, engine 10 is a GE90 engine available from General Electric Aircraft Engines, Cincinnati, Ohio.

In operation, air flows through fan assembly 12 and compressed air is supplied from fan assembly 12 to high pressure compressor 14. The highly compressed air is delivered to combustor 16. Airflow from combustor 16 drives rotating turbines 18 and 20 and exits gas turbine engine 10 through an exhaust system 28.

Figure 2:
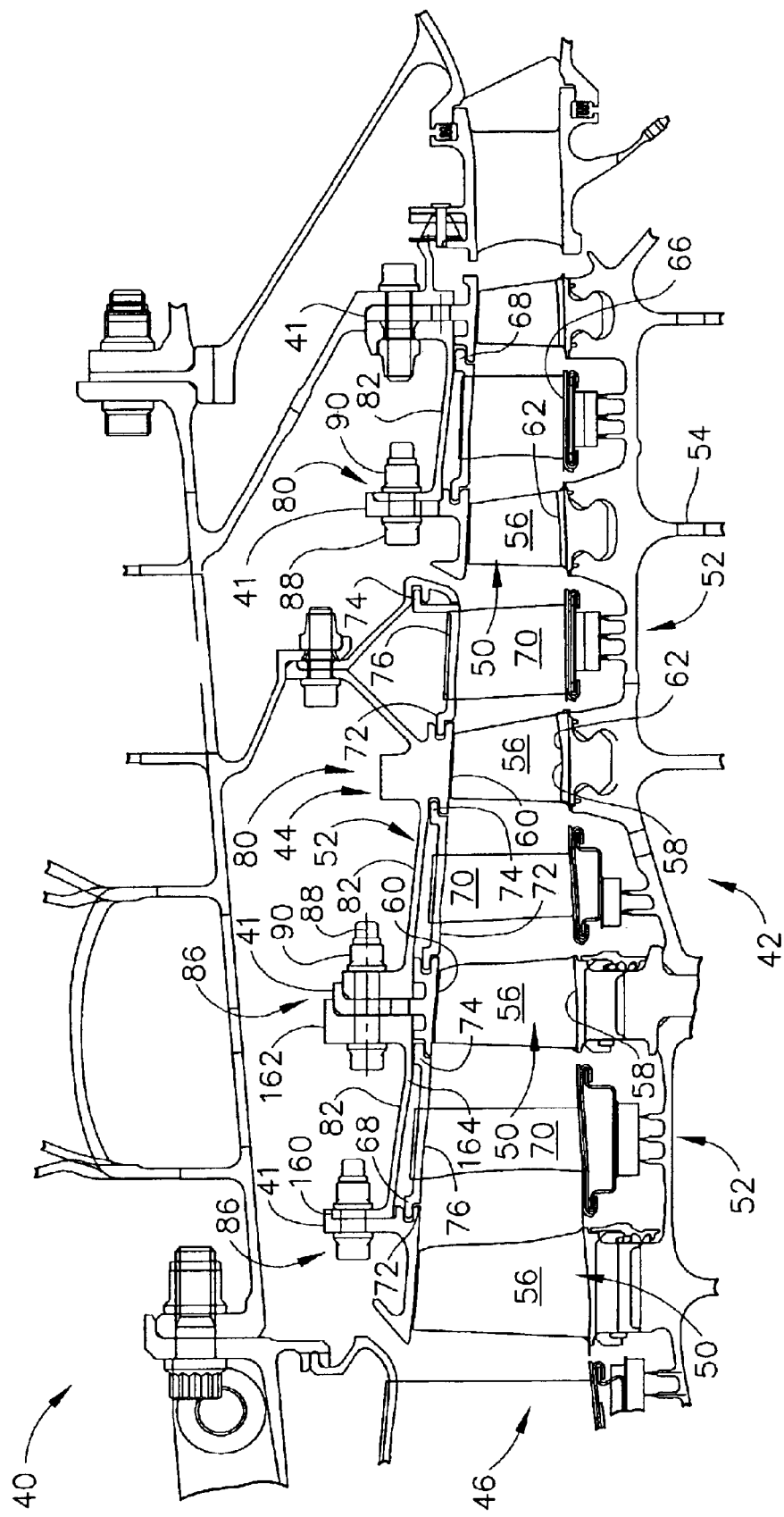
FIG. 2 is a cross-sectional illustration of a portion of a compressor that may be used with the gas turbine engine shown in FIG. 1.
Figure 3:
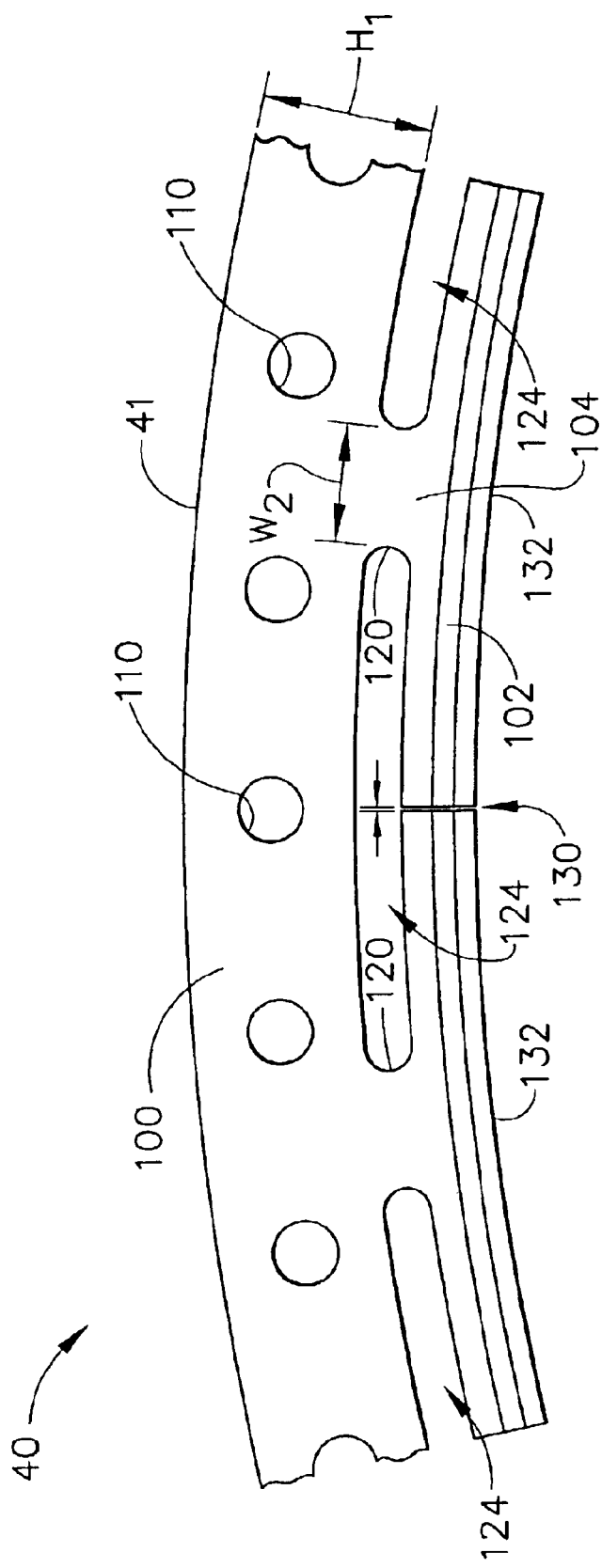
FIG. 3 is an enlarged front view of a portion of an exemplary compressor casing ring that may be used with the compressor shown in FIG. 2.
Figure 4:
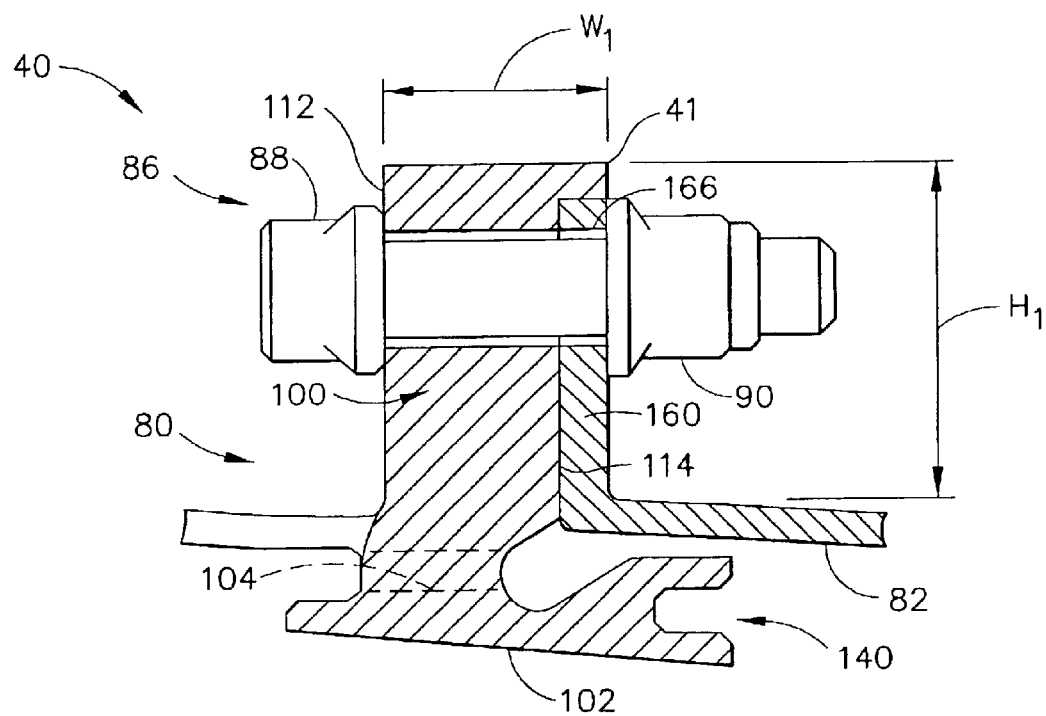
FIG. 4 is an enlarged cross-sectional view of the compressor ring shown in FIG. 3.

FIG. 2 is a cross-sectional illustration of a portion of a compressor 40 that may be used with gas turbine engine 10. FIG. 3 is an enlarged front view of a portion of an exemplary compressor casing ring 41 that may be used with compressor 40. FIG. 4 is an enlarged cross-sectional view of compressor casing ring 41. In the exemplary embodiment, compressor 40 is a high pressure compressor. Compressor 40 includes a rotor assembly 42 and a stator assembly 44 that are coupled together to define a flowpath 46 through compressor 40. Specifically, compressor 40 includes a plurality of stages, and each stage includes a row of rotor blades 50 and a row of stator vane assemblies 52. In the exemplary embodiment, rotor blades 50 are supported by a rotor disk 54. More specifically, each rotor blade 50 extends radially outwardly from rotor disk 54 and includes an airfoil 56 that extends radially between a rim 58 and a tip 60.

Stator assembly 44 includes a plurality of rows of stator vane assemblies 52. Each row of vane assemblies 52 is positioned between adjacent rows of rotor blades 50. The compressor stages are configured for cooperating with a motive or working fluid, such as air, such that the motive fluid is compressed in succeeding stages. Outer surfaces 62 of rotor rims 58 define a portion of a radially inner flowpath boundary surface of flowpath 46 as the motive fluid is compressed from stage to stage.

Each vane assembly 52 includes an inner band 66, an outer band 68, and an airfoil 70 extending therebetween. Each outer band 68 includes an upstream mounting flange 72, a downstream mounting flange 74, and a band body 76 extending therebetween. Outer band flange assemblies 72 and 74 couple to a compressor casing 80 surrounding rotor and stator assemblies 42 and 44, respectively, to form a radially outer flowpath boundary surface of flowpath 46 as the motive fluid is compressed from stage to stage. Outer bands 68 define a portion of the radially outer flowpath boundary surface of flowpath 46 as the motive fluid flows through vane assemblies 52, and inner bands 66 define a portion of the radially inner flowpath boundary surface of flowpath 46 as motive fluid flows through vane assemblies 52.

Casing 80 is known as a stacked ring configuration and includes a plurality of annular rings 41 and connector rings 82 coupled together by a plurality of fastener assemblies 86. In the exemplary embodiment, each fastener assembly includes a plurality of threaded bolts 88 and nuts 90 that couple together to form a controlling mass that secures rings 41 and 82 together. More specifically, each annular ring 41 includes a flange portion 100, a flowpath surface 102, and a ligament portion 104 that extends therebetween. In the exemplary embodiment, flowpath surface 102 is formed integrally with flange portion 100 and ligament portion 104.

Each ring flange portion 100 is annular and includes a plurality of circumferentially-spaced openings 110 extending therethrough between an upstream side 112 of flange portion 100 to a downstream side 114 of flange portion 100. Each opening 110 is sized to receive bolts 88 therethrough to enable fastener assemblies 86 to couple adjacent rings 41 and 82 together. A width $W_1$ of each flange portion 100 and a height $H_1$ of each flange portion 100 are variably selected to minimize weight considerations and/or thermal mass considerations while providing predetermined strength and fatigue life requirements to casing 80.

Ring ligament portion 104 extends between flange portion 100 and flowpath surface 102. In the exemplary embodiment, ligament portion 104 includes a plurality of circumferentially-spaced ligaments 120 that extend radially between flowpath surface 102 and flange portion 100. More specifically, each ligament 120 has a circumferential width $W_2$ that is variably selected to facilitate reducing thermal stress conduction from flowpath surface 102 to flange portion 100. Accordingly, in the exemplary embodiment, ligament portion 104 includes a plurality of circumferentially-spaced openings 124 that each extend between circumferentially adjacent ligaments 120. In an alternative embodiment, ligament portion 104 does not include any openings 124. More specifically, the dimensions of flange portion 100 and ligaments 120 are variably selected in combination to facilitate controlling transient and steady-state thermal growth of each ring 41.

Flowpath surface 102 is oriented generally perpendicularly with respect to flange portion 100, and is circumferentially segmented around each respective row of rotor blades 50, and as such, each flowpath surface 102 is also known as a rotor land. More specifically, in the exemplary embodiment, a plurality of relief cuts 130 extend radially through flowpath surface 102 into a respective ligament portion opening 124, such that flowpath surface 102 is circumferentially divided into a plurality of arcuate portions 132. In the exemplary embodiment, thirty relief cuts are equally spaced circumferentially through flowpath surface 102. In an alternative embodiment, flowpath surface 102 does not include any relief cuts 130.

In the exemplary embodiment, flow path surface 102 is formed with at least one hook assembly 140 for coupling each ring 41 to a respective stator vane assembly 52. Accordingly, each hook assembly 140 is also segmented into arcuate portions by relief cuts 130. Specifically, each ring hook assembly 140 is sized to receive a respective outer band flange assembly 72 or 74 therein. In an alternative embodiment, flow path surface 102 is formed with a pair of hook assemblies 140.

Connector rings 82 are annular and extend axially between adjacent rings 41. More specifically, each connector ring 82 includes an upstream mounting flange 160, a downstream mounting flange 162, and a solid connector body 164 extending therebetween. Each mounting flange 162 and 160 includes a plurality of circumferentially-spaced openings 166 that are sized to receive fastener assembly bolts 88 therethrough.

When compressor 40 is assembled, each stator vane assembly 52 is coupled to casing 80 such that a radially outer flowpath boundary of flowpath 46 is defined by ring flowpath surfaces 102 and stator vane assembly outer bands 68, and such that a radially inner flowpath boundary of flowpath 46 is defined by stator vane assembly inner bands 66 and rotor assembly rims 58. Furthermore, when compressor 40 is assembled, each connector ring 82 is positioned radially outwardly from a respective stator vane assembly outer band body 76. In addition, when fully assembled, stator vane flange assemblies 72 and/or 74 are positioned substantially circumferentially across ligament portion openings 124 to facilitate restricting leakage flow through openings 124.

During operation, ring flowpath surfaces 102 facilitate insulating the controlling mass or fastener assemblies 86 from flowpath 46. Furthermore, the insulating effect allows rings 41 facilitates a lighter weight design of compressor 40 for the same thermal response rate. Additionally, because flowpath surfaces 102 are segmented by relief cuts 130, the segmentation facilitates preventing surfaces 102 from adversely impacting or contributing to radial deflection of rings 41. In addition, ligaments 120 facilitate controlling the thermal growth rate, as well as steady-state growth of stator assembly 44. As a result, clearances between rotor blade tips 60 and surrounding rotor lands 102 are facilitated to be maintained and controlled.

Figure 5:
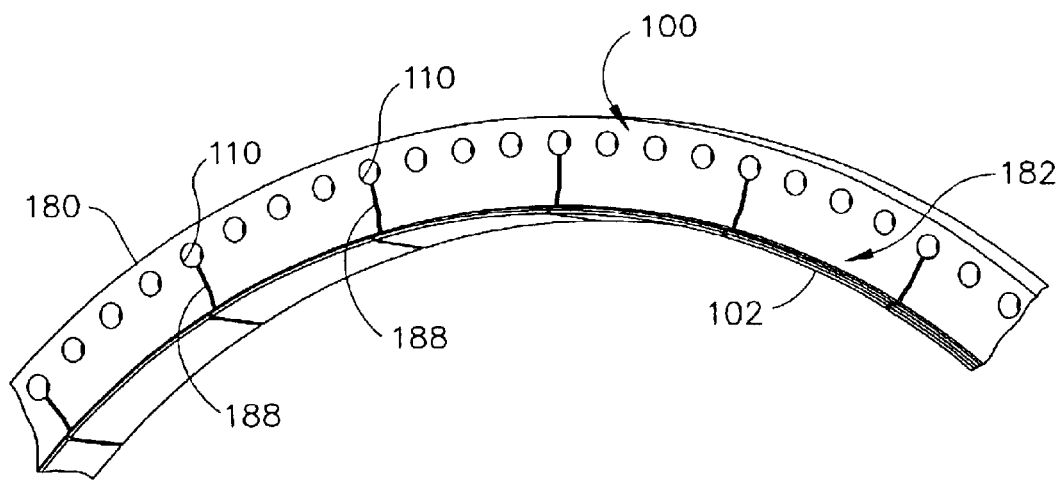
FIG. 5 is a perspective view of an alternative embodiment of a compressor casing ring that may be used with the compressor shown in FIG. 2.

FIG. 5 is a perspective view of an alternative embodiment of a compressor casing ring 180 that may be used with compressor 40 shown in FIG. 2. Compressor casing ring 180 is substantially similar to compressor casing rings 41 shown in FIGS. 2, 3, and 4, and components of casing ring 180 that are identical to components of casing ring 41 are identified in FIG. 5 using the same reference numerals used in FIGS. 2, 3, and 4. Accordingly, casing ring 180 includes annular ring flange portion 100 and a segmented flowpath surface 102. Casing ring 180 also includes a ligament portion 182 that extends between ring flange portion 100 and flowpath surface 102.

Ligament portion 182 is circumferentially-segmented into a plurality of arcuate sections that extend substantially circumferentially between flange portion 100 and flowpath surface 102. More specially, ligament portion 182 does not include openings 124, but rather is segmented by a plurality of relief cuts 188 that extend radially through flowpath surface 102 into a respective ring flange opening 110.

Figure 6:
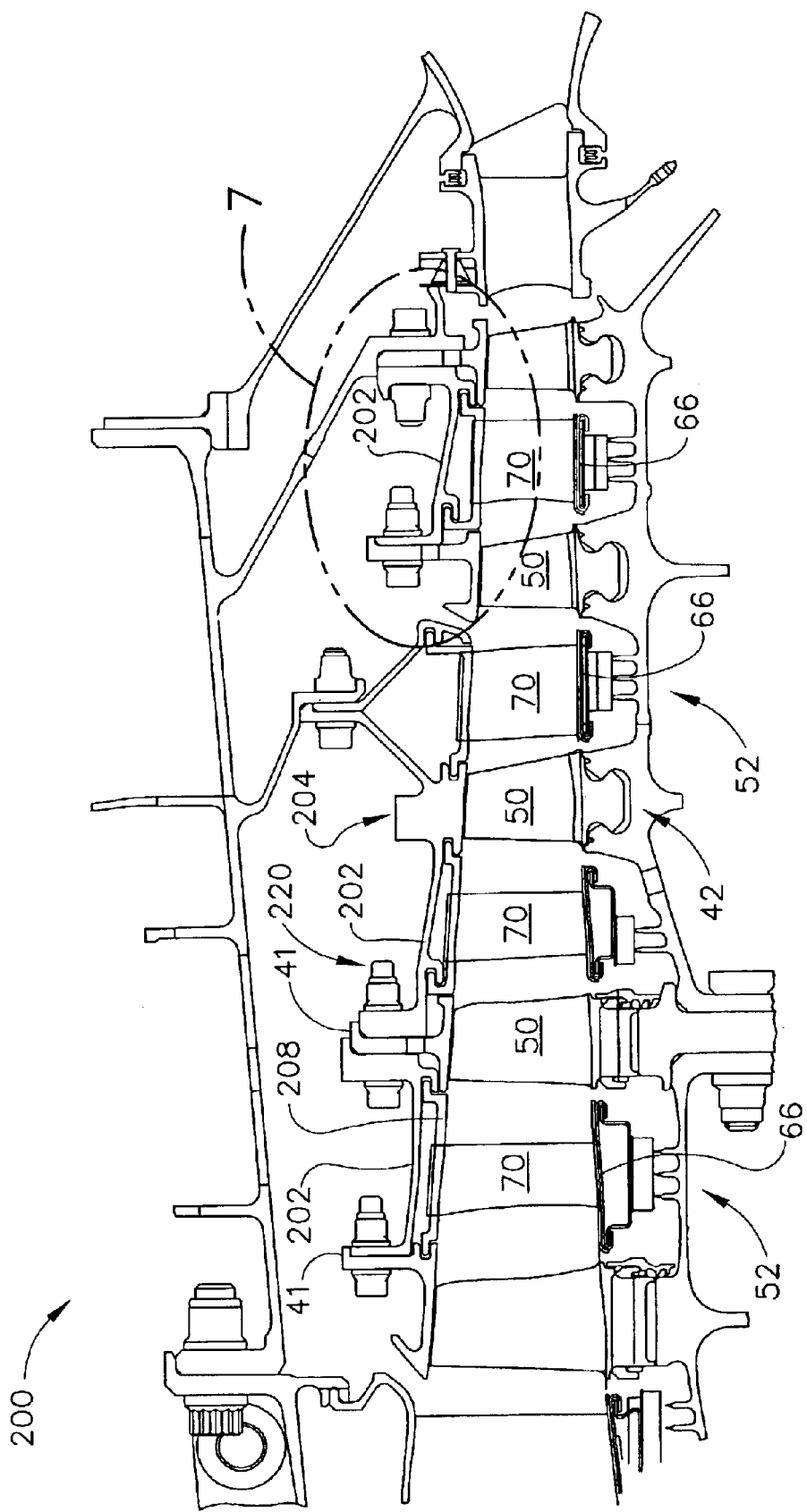
FIG. 6 is a cross-sectional illustration of a portion of an alternative embodiment of a compressor that may be used with the gas turbine engine shown in FIG. 1.
Figure 7:
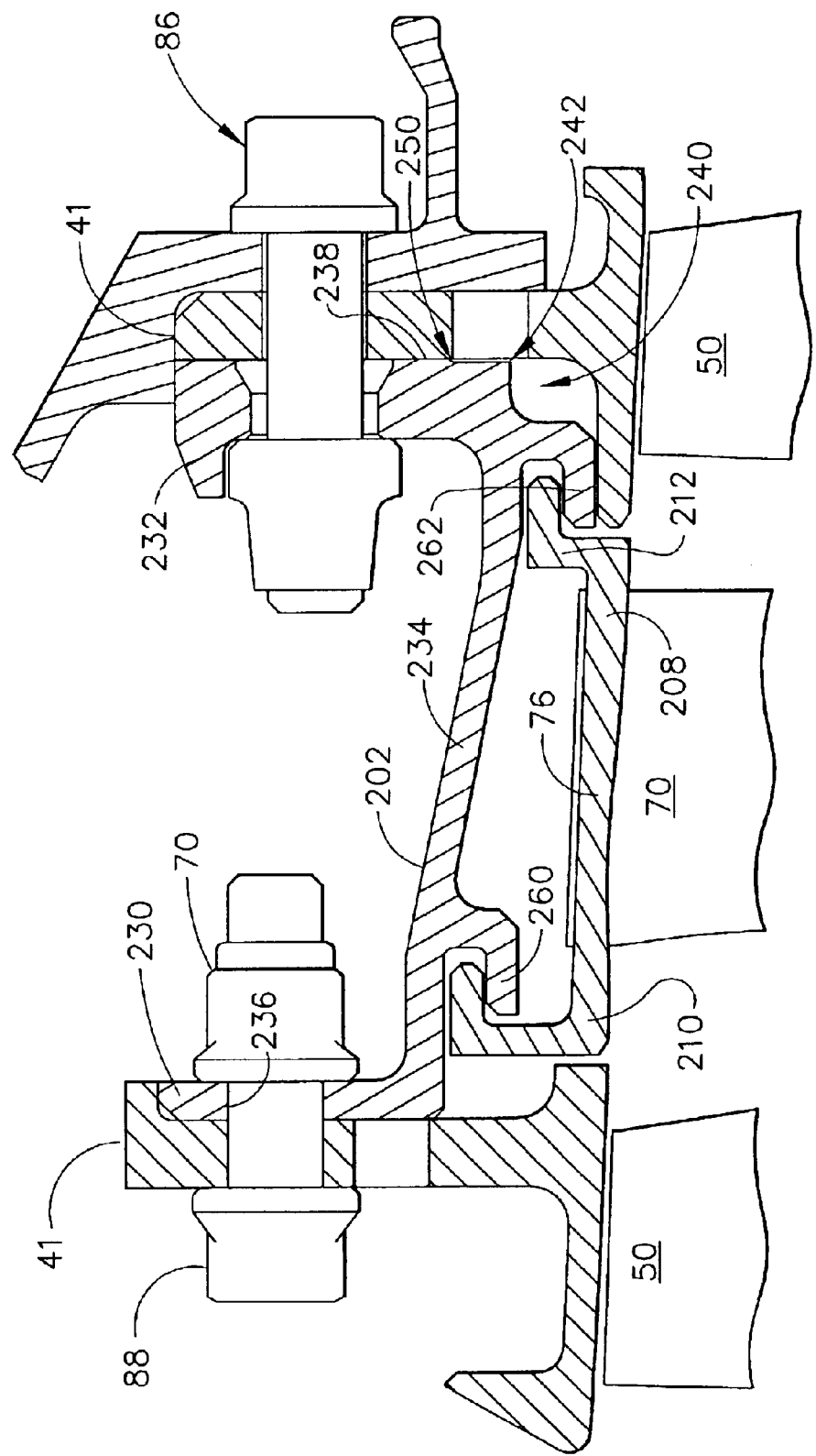
FIG. 7 is an enlarged view of an exemplary compressor casing connector ring shown in FIG. 6 and taken along area 7.

FIG. 6 is a cross-sectional illustration of a portion of an alternative embodiment of a compressor 200 that may be used with gas turbine engine 10. FIG. 7 is an enlarged view of a portion of an exemplary compressor casing connector ring 202 that may be used with compressor 200. In the exemplary embodiment, compressor 200 is a high pressure compressor. Compressor 200 is substantially similar to compressor 40 shown in FIGS. 2, 3, and 4, and components of compressor 200 that are identical to components of compressor 40 are identified in FIGS. 6 and 7 using the same reference numerals used in FIGS. 2, 3, and 4. Accordingly, compressor 200 includes rotor assembly 42 and stator assembly 204 that are coupled together to define compressor flowpath 46.

Stator assembly 204 includes a plurality of rows of stator vane assemblies 52. Each row of vane assemblies 52 is positioned between adjacent rows of rotor blades 50. Each vane assembly 52 includes an inner band 66, an outer band 208, and an airfoil 70 extending therebetween. Each outer band 208 includes an upstream mounting hook 210, a downstream mounting hook 212, and a band body 76 extending therebetween. Outer band hook assemblies 210 and 212 couple to a compressor casing 220 surrounding rotor and stator assemblies 42 and 204, respectively, to form a radially outer flowpath boundary surface of flowpath 46 as the motive fluid is compressed from stage to stage. Outer bands 208 define a radially outer flowpath boundary surface of flowpath 46 as the motive fluid flows through vane assemblies 52.

Compressor casing 220 is substantially similar to casing 80 (shown in FIG. 2), and is also known as a stacked ring configuration. Casing 220 includes a plurality of annular rings 41 and connector rings 202 coupled together by a plurality of fastener assemblies 86. Connector rings 202 are annular and extend axially between adjacent rings 41. More specifically, each connector ring 202 includes an upstream mounting flange 230, a downstream mounting flange 232, and a solid connector body 234 extending therebetween. Each mounting flange 232 and 230 includes a plurality of circumferentially-spaced openings 236 that are sized to receive fastener assembly bolts 88 therethrough.

A downstream surface 238 of each downstream mounting flange 232 includes a recessed portion 240. Specifically, each recessed portion 240 extends radially upwardly from a radially lower corner 242 defined between flange 232 and body 234 towards flange openings 236. In one embodiment, recessed portion 240 extends circumferentially around each ring 202. In another embodiment, recessed portions 240 are circumferentially-spaced around each ring 232 such that each recessed portion 240 is radially outward from a respective relief cut 130 (shown in FIG. 4). Accordingly, when compressor 200 is assembled, each downstream mounting flange 232 is positioned against a respective ring flange portion 100 such that a gap 250 is defined between coupled annular rings 41 and connector rings 202. More specifically, gap 250 is defined between mounting flange recessed portion 240 and ring flange portion 100. During operation, gap 250 permits tangential growth of annular rings 41 with respect to connector rings 202.

In addition, each annular connector ring 202 also includes an upstream hook assembly 260 and a downstream hook assembly 262. Hook assemblies 260 and 262 are annular and extend radially inwardly from body 234. During assembly of compressor 200, stator vane assemblies 52 are coupled to casing 220 by hook assemblies 260 and 262. More specifically, connector ring hook assemblies 260 and 262 each respectively couple to stator vane outer band mounting hooks 210 and 212 to securely couple stator assembly 52 to casing 220.

The above-described compressor casing assembly provides a cost-effective and reliable means for controlling blade tip clearances defined between the rotor blade tips and the surrounding rotor lands. More specifically, the compressor assembly employs stacked rings with continuous mounting flanges, but with segmented integral flowpath surfaces. The flowpath surfaces insulate the controlling mass or fastening assemblies from the flowpath air, while the relief cuts facilitate preventing the flowpath surface from adversely contributing to the radial deflection of the ring. Moreover, the size of the ring mounting flange and the size of the ligaments extending between the flowpath surface and the mounting flange are variably sized to control the transient and steady-state thermal growth of the casing rings. Accordingly, the casing rings facilitate improving operational performance of the compressor in a weight-effective and reliable manner.

Exemplary embodiments of compressor assemblies are described above in detail. The compressor assemblies are not limited to the specific embodiments described herein, but rather, components of each assembly may be utilized independently and separately from other components described herein. For example, each casing ring component can also be used in combination with other compressor assembly and engine components, and in combination with the other casing ring components described herein.

While the invention has been described in terms of various specific embodiments, those skilled in the art will recognize that the invention can be practiced with modification within the spirit and scope of the claims.

What is claimed is:

1. A method for assembling a gas turbine engine compressor including a stator assembly and a rotor assembly, said method comprising:

providing a casing formed from a plurality of rings;

coupling a first of the casing rings around the rotor assembly such that a radially inner surface of the first casing ring is axially aligned with, and radially outward from, a row of rotor blades extending from the rotor assembly, wherein the first casing ring includes a ligament portion including a plurality of circumferentially spaced ligaments and a plurality of circumferentially-spaced ligament openings adjacent each of the ligaments, wherein the first casing ring includes at least one relief cut that extends from the radially inner surface to the ligament openings; and coupling a second of the casing rings to the first casing ring with a fastener assembly, such that the first casing ring radially inner surface facilitates insulating the fastener assembly from the compressor flowpath.

2. A method in accordance with claim 1 wherein coupling a first of the casing rings around the rotor assembly further comprises coupling the first casing ring around the rotor assembly such that the radially inner surface is circumferentially segmented around the rotor assembly.

3. A method in accordance with claim 1 wherein the stator assembly includes a plurality of vane assemblies that each include an outer band, said method further comprising coupling at least one vane assembly outer band to at least one of the first casing ring and the second casing ring using an annular hook assembly.

4. A method in accordance with claim 1 wherein coupling a second of the casing rings to the first casing ring further comprises coupling the second casing ring to the first casing ring such that a gap is defined between the first casing ring and a recessed portion of the second casing ring.

5. A method in accordance with claim 1 wherein coupling a first of the casing rings around the rotor assembly further comprises coupling a first of the casing rings around the rotor assembly that includes an annular flange portion such that the ligament portion extends between the annular flange portion and the radially inner surface, and wherein the ligaments have a circumferential width that is variably selected to facilitate reducing thermal growth of the first casing ring.

6. A compressor for a gas turbine engine, said compressor comprising:

a rotor assembly comprising a plurality of circumferentially-spaced apart rotor blades, each said blade extending radially outwardly from a radially inner rim to a tip, each said rim defining a portion of a radially inner flowpath surface through said compressor;

a casing extending circumferentially around said rotor assembly, said casing comprising at least a first ring and a second ring, said first ring comprising a ligament portion comprising a plurality of circumferentially spaced ligaments and a plurality of circumferentially-spaced ligament openings adjacent each of said plurality of ligaments, said first ring comprising a radially inner surface defining a portion of a radially outer flowpath surface through said compressor, said first ring inner surface spaced radially outwardly from said plurality of rotor blade tips, said first ring comprising at least one relief cut extending between said radially inner surface and said ligament opening, said second ring coupled to said first ring by a fastener assembly, said first ring radially inner surface facilitates substantially insulating said fastener assembly from the compressor flowpath.

7. A compressor in accordance with claim 6 wherein said casing ring comprises an annular attachment flange, said plurality of ligaments extending radially between said attachment flange and said radially inner surface.

8. A compressor in accordance with claim 7 wherein a circumferential width of each of said plurality of ligaments is variably selected to control thermal growth of said first ring.

9. A compressor in accordance with claim 6 wherein said first ring radially inner surface is circumferentially segmented.

10. A compressor in accordance with claim 6 wherein further comprising a stator assembly comprising a plurality of vane assemblies, each said vane assembly comprising an outer band coupled to at least one of said casing first ring and said casing second ring.

11. A compressor in accordance with claim 10 wherein said casing second ring comprises an annular hook configured to couple to said vane assembly outer band.

12. A compressor in accordance with claim 10 wherein said casing second ring comprises an annular flange comprising a plurality of openings extending therethrough, each said fastener assembly extends through each said second ring flange opening to couple said casing second ring to said casing first ring.

13. A compressor in accordance with claim 12 wherein at least a portion of said casing second ring is recessed such that a gap is defined between said second ring flange and said first ring when said first and second rings are coupled together.

14. A gas turbine engine comprising:

a rotor assembly comprising a plurality of rows of circumferentially-spaced apart rotor blades, each said blade extending radially outwardly from a radially inner rim to a tip, each said rim defining a portion of a radially inner flowpath surface through said compressor;

a stator assembly comprising at least one row of vane assemblies extending between adjacent rows of rotor blades, each said vane assembly comprising a vane and an outer band; and a casing extending circumferentially around said rotor and stator assemblies, said casing comprising a plurality of rings coupled together by at least one fastener assembly, a first of said plurality of rings axially aligned with, and radially outward from at least one row of said plurality of rotor blades, said first ring comprising a radially outer surface, said first ring comprising a ligament portion comprising a plurality of circumferentially spaced ligaments and a plurality of circumferentially-spaced ligament openings adjacent each of said plurality of ligaments, said first ring comprising a radially inner surface defining a portion of a radially outer flowpath surface through said compressor, said first ring radially inner surface facilitates substantially insulating said at least one fastener assembly from an engine combustion flowpath defined through said engine, said first ring comprising a relief cut extending only partially between said radially inner surface and said radially outer surface.

15. A gas turbine engine in accordance with claim 14 wherein said casing first ring comprises an annular attachment flange portion, said ligament portion extending between said flange and said radially inner surface, said flange portion comprises a plurality of circumferentially-spaced openings extending therethrough.

16. A gas turbine engine in accordance with claim 15 wherein said casing first ring plurality of ligaments each have a circumferential width that is variably selected to facilitate controlling thermal growth of said first ring.

17. A gas turbine engine in accordance with claim 14 wherein each said stator assembly vane assembly outer band is coupled to said casing first ring.

18. A gas turbine engine in accordance with claim 14 wherein said casing plurality of rings further comprises at least a second ring coupled to said first ring by said at least one fastener assembly, said second ring comprises an annular hook configured to couple to said stator assembly vane assembly outer band.

19. A gas turbine engine in accordance with claim 18 wherein at least a portion of said casing second ring is recessed such that when said first ring is coupled to said second ring by said at least one fastener assembly, a gap is defined between said first and second rings.

20. A gas turbine engine in accordance with claim 14 wherein said casing first ring radially inner surface is circumferentially segmented.

* * * * *